US012586174B2

(12) United States Patent
Peng et al.

(10) Patent No.: US 12,586,174 B2
(45) Date of Patent: Mar. 24, 2026

(54) METHOD FOR PROCESSING YARN SPINDLE DATA, ELECTRONIC DEVICE AND STORAGE MEDIUM

(71) Applicants: ZHEJIANG HENGYI PETROCHEMICAL CO., LTD., Hangzhou (CN); Hangzhou Yichen Chemical Fiber Co., Ltd., Hangzhou (CN)

(72) Inventors: Xiantao Peng, Hangzhou (CN); Peng Wang, Hangzhou (CN); Yibo Qiu, Hangzhou (CN); Dake Li, Hangzhou (CN); Mingyi Liu, Hangzhou (CN); Feng Xu, Hangzhou (CN); Junliang Jin, Hangzhou (CN)

(73) Assignees: ZHEJIANG HENGYI PETROCHEMICAL CO., LTD., Hangzhou (CN); HANGZHOU YICHEN CHEMICAL FIBER CO., LTD., Zhejiang (CN)

( * ) Notice: Subject to any disclaimer, the term of this patent is extended or adjusted under 35 U.S.C. 154(b) by 0 days.

(21) Appl. No.: 19/025,688

(22) Filed: Jan. 16, 2025

(65) Prior Publication Data

US 2025/0252549 A1      Aug. 7, 2025

(30) Foreign Application Priority Data

Feb. 4, 2024    (CN) .......................... 202410161074.7

(51) Int. Cl.
*G06T 7/00*          (2017.01)
*G06V 10/30*        (2022.01)
(Continued)

(52) U.S. Cl.
CPC ............ *G06T 7/0004* (2013.01); *G06V 10/30* (2022.01); *G06V 10/7715* (2022.01);
(Continued)

(58) Field of Classification Search
None
See application file for complete search history.

(56) References Cited

U.S. PATENT DOCUMENTS

2020/0285911 A1     9/2020   Guo et al.
2022/0254005 A1     8/2022   Wilkinson et al.

FOREIGN PATENT DOCUMENTS

CN          111292305 A        6/2020
CN          111353442 A        6/2020
(Continued)

OTHER PUBLICATIONS

Jul. 23, 2025 (EP) Extended Search Report—App. No. 25151735.5.
(Continued)

*Primary Examiner* — Chan S Park
*Assistant Examiner* — Promotto Tajrian Islam
(74) *Attorney, Agent, or Firm* — Banner & Witcoff, Ltd.

(57)          ABSTRACT

A method for processing yarn spindle data, an electronic device and a storage medium, relating to the field of data processing technology, are provided. The method includes: after determining that a yarn spindle is transported into a detection area, performing a defect detection on the yarn spindle located in the detection area to obtain a target detection result of the yarn spindle. The target detection result is used to characterize a defect degree of the yarn spindle. The method further includes: after determining that the target detection result meets a preset defect value, obtaining a target level of the yarn spindle based on the target detection result of the yarn spindle and a preset level of the yarn spindle.

12 Claims, 9 Drawing Sheets

S101

When determining that a yarn spindle transported enters a detection area, performing defect detection on the yarn spindle located in the detection area to obtain a target detection result of the yarn spindle

S102

When determining that the target detection result meets a preset defect requirement, obtaining a target level of the yarn spindle based on the target detection result of the yarn spindle and a preset level of the yarn spindle

(51) Int. Cl.
    *G06V 10/77*        (2022.01)
    *G06V 10/82*        (2022.01)

(52) U.S. Cl.
    CPC .... *G06V 10/82* (2022.01); *G06T 2207/20084*
        (2013.01); *G06T 2207/30124* (2013.01)

(56)                References Cited

FOREIGN PATENT DOCUMENTS

| | | | | | | |
|---|---|---|---|---|---|---|
| CN | 112241646 | A | | 1/2021 | | |
| CN | 112819780 | A | | 5/2021 | | |
| CN | 113869325 | A | * | 12/2021 | ............. | G06N 3/047 |
| CN | 114092820 | A | | 2/2022 | | |
| CN | 114299065 | A | * | 4/2022 | | |
| CN | 114399440 | A | | 4/2022 | | |
| CN | 114511576 | A | | 5/2022 | | |
| CN | 115205224 | A | | 10/2022 | | |
| CN | 116091942 | A | | 5/2023 | | |
| CN | 116152622 | A | * | 5/2023 | ........... | G06V 10/806 |
| CN | 116167992 | A | * | 5/2023 | ........... | G06T 7/0004 |
| CN | 116258906 | A | * | 6/2023 | ........... | G06V 10/764 |
| CN | 116580393 | A | | 8/2023 | | |
| CN | 117437194 | A | | 1/2024 | | |
| CN | 117455217 | A | | 1/2024 | | |
| EP | 00934897 | A1 | | 8/1999 | | |
| JP | 2000038256 | A | | 2/2000 | | |
| JP | 2021085659 | A | | 6/2021 | | |
| WO | 2023169582 | A1 | | 9/2023 | | |

OTHER PUBLICATIONS

Feb. 17, 2025—(JP) Decision to Grant a Patent—App 2025-003465.

Jan. 22, 2025—(JP) Notice of Reasons of Refusal—App 2025-003465.

China National Intellectual Property Administration, "First Office Action and Search Report," Issued in connection with Chinese Patent Application No. 202410161074.7, Mar. 24, 2024, 30 pages. [English Translation Included].

China National Intellectual Property Administration, "Notification on Grant of the Patent Right for Invention," Issued in connection with Chinese Patent Application No. 202410161074.7, Mailed Apr. 19, 2024, 14 pages. [English Translation Included].

Guoxiu Jin, "A Brief Discussion on Convolutional Neural Networks," 2 pages. [English Abstract Included].

Runxi Wei et al., "Optical Remote Sensing Image Target Detection Based on Improved Feature Pyramid," IEEE Journal of Selected Topics in Applied Earth Observations and Remote Sensing, vol. 16, 2023, 11 pages.

Yang Aiping et al., "Multi-Feature Concatenation Network for Object Detection" Journal of Tianjin University, Jun. 2020, 6 pages. [English Abstract Included].

* cited by examiner

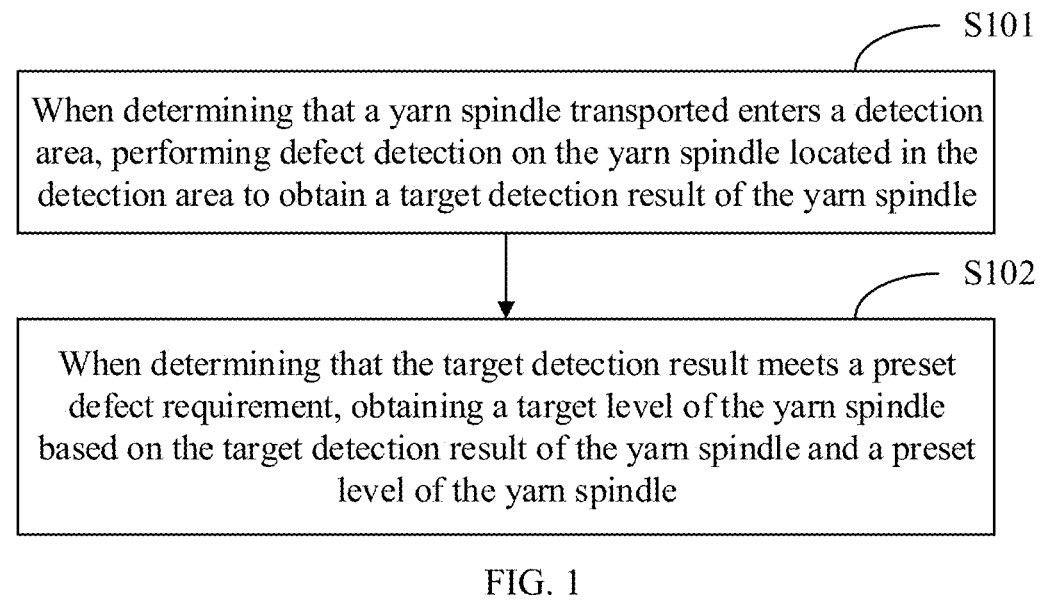

S101

When determining that a yarn spindle transported enters a detection area, performing defect detection on the yarn spindle located in the detection area to obtain a target detection result of the yarn spindle

S102

When determining that the target detection result meets a preset defect requirement, obtaining a target level of the yarn spindle based on the target detection result of the yarn spindle and a preset level of the yarn spindle

FIG. 1

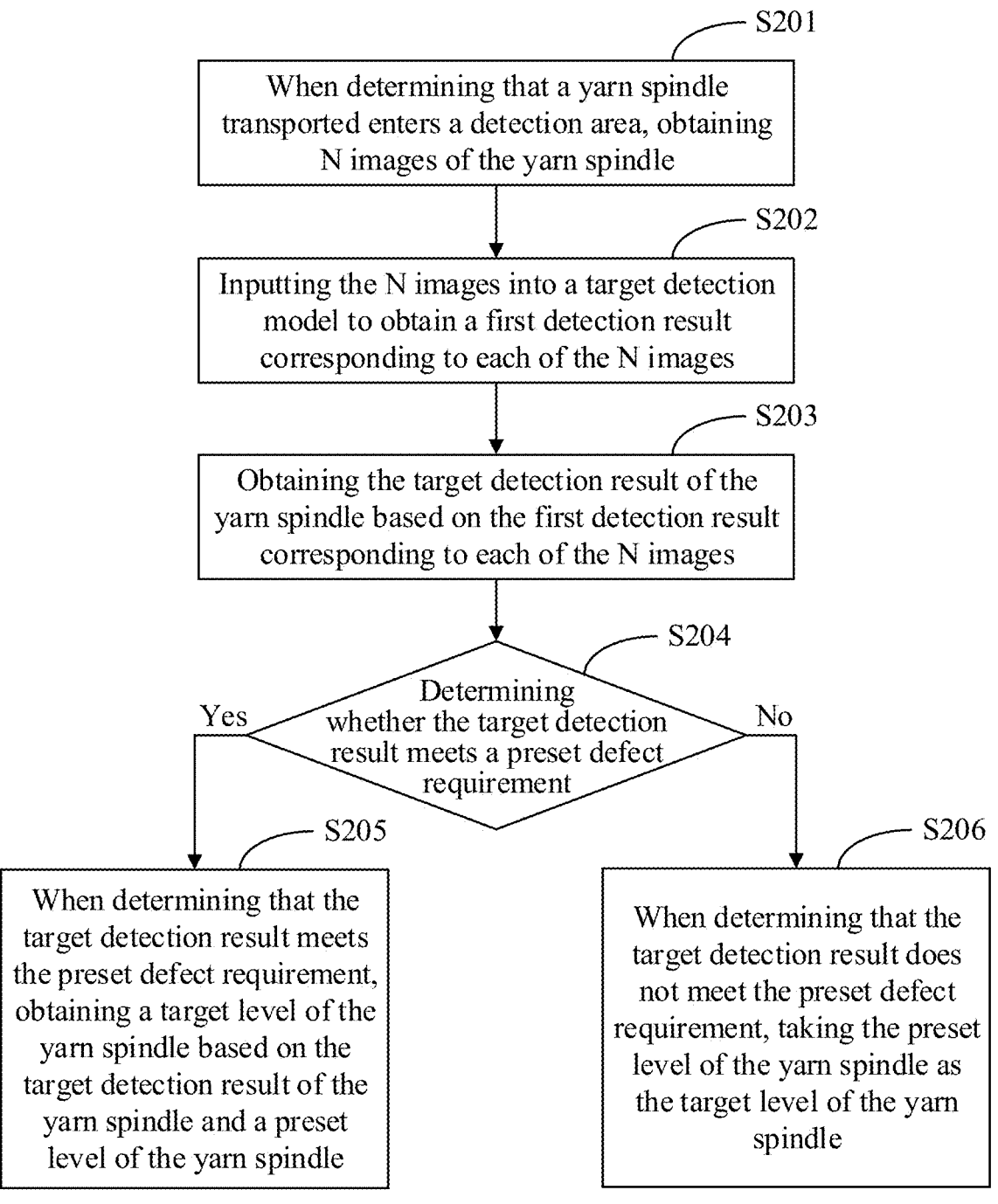

— S201

When determining that a yarn spindle transported enters a detection area, obtaining N images of the yarn spindle

— S202

Inputting the N images into a target detection model to obtain a first detection result corresponding to each of the N images

— S203

Obtaining the target detection result of the yarn spindle based on the first detection result corresponding to each of the N images

— S204

Determining whether the target detection result meets a preset defect requirement Yes                    No

— S205

When determining that the target detection result meets the preset defect requirement, obtaining a target level of the yarn spindle based on the target detection result of the yarn spindle and a preset level of the yarn spindle

— S206

When determining that the target detection result does not meet the preset defect requirement, taking the preset level of the yarn spindle as the target level of the yarn spindle

FIG. 2

Apparatus for processing yarn spindle data

Defect detection unit 901

Level determining unit 902

1010

Memory

Bus

1020

Processor

1030

Communication
interface

METHOD FOR PROCESSING YARN SPINDLE DATA, ELECTRONIC DEVICE AND STORAGE MEDIUM

CROSS-REFERENCE TO RELATED APPLICATIONS

The present application claims priority to Chinese Patent Application No. CN202410161074.7, filed on Feb. 4, 2024, the disclosure of which is hereby incorporated herein by reference in its entirety.

FIELD

The present disclosure relates to the field of data processing technology, and in particular, to a method and an apparatus for processing yarn spindle data, a device and a storage medium.

BACKGROUND

In the chemical fiber industry, workers are usually required to perform defect detection on individual yarn spindles, and re-evaluate levels of the yarn spindles based on detection results. However, the detection method is highly dependent on manual experience and is inefficient to affect production and management efficiency of the yarn spindles.

SUMMARY

The present disclosure provides a method and an apparatus for processing yarn spindle data, an electronic device and a storage medium, to solve or alleviate one or more problems in the field.

In a first aspect, the present disclosure provides a method for processing yarn spindle data, including:

when determining that a yarn spindle transported enters a detection area, performing defect detection on the yarn spindle located in the detection area to obtain a target detection result of the yarn spindle; where the target detection result is used to characterize a defect degree of the yarn spindle; and when determining that the target detection result meets a preset defect requirement, obtaining a target level of the yarn spindle based on the target detection result of the yarn spindle and a preset level of the yarn spindle.

In a second aspect, the present disclosure provides an apparatus for processing yarn spindle data, including:

a defect detection unit configured to, when determining that a yarn spindle transported enters a detection area, perform defect detection on the yarn spindle located in the detection area to obtain a target detection result of the yarn spindle; where the target detection result is used to characterize a defect degree of the yarn spindle; and a level determining unit configured to, when determining that the target detection result meets a preset defect requirement, obtain a target level of the yarn spindle based on the target detection result of the yarn spindle and a preset level of the yarn spindle.

In a third aspect, the present disclosure provides an electronic device, including:

at least one processor; and a memory connected in communication with the at least one processor;

where the memory stores an instruction executable by the at least one processor, and the instruction, when executed by the at least one processor, enables the at least one processor to execute the method of any embodiment of the present disclosure.

In a fourth aspect, the present disclosure provides a non-transitory computer-readable storage medium storing a computer instruction thereon, and the computer instruction is used to cause a computer to execute the method of any embodiment of the present disclosure.

In a fifth aspect, the present disclosure provides a computer program product including a computer program, and the computer program implements the method of any embodiment of the present disclosure, when executed by a processor.

The beneficial effects provided by the present disclosure at least include: the present disclosure firstly performs automatic defect detection on the appearance of the yarn spindle, and then accurately evaluates the actual level of the yarn spindle according to the actual defect situation of the yarn spindle (such as the target detection result), and then quickly adjusts the level of the yarn spindle, thus realizing a complete set of automated processing flow from the defect detection of the yarn spindle to the level evaluation of the yarn spindle. The present disclosure can efficiently detect defects in yarn spindles without relying on manual experience, and can automatically adjust the levels of the yarn spindles according to the detection results, thereby saving a lot of manpower and time, and further improving management efficiency of the yarn spindles.

It should be understood that the content described in this part is not intended to identify critical or essential features of embodiments of the present disclosure, nor is it used to limit the scope of the present disclosure. Other features of the present disclosure will be easily understood through the following description.

BRIEF DESCRIPTION OF THE DRAWINGS

In the accompanying drawings, the same reference numbers represent the same or similar parts or elements throughout the accompanying drawings, unless otherwise specified. These accompanying drawings are not necessarily drawn to scale. It should be understood that these accompanying drawings only depict some embodiments provided according to the present disclosure, and should not be considered as limiting the scope of the present disclosure.

FIG. 1 is a first schematic flowchart of a method for processing yarn spindle data according to an embodiment of the present application;

FIG. 2 is a second schematic flowchart of a method for processing yarn spindle data according to an embodiment of the present application;

DETAILED DESCRIPTION

Figure 3:
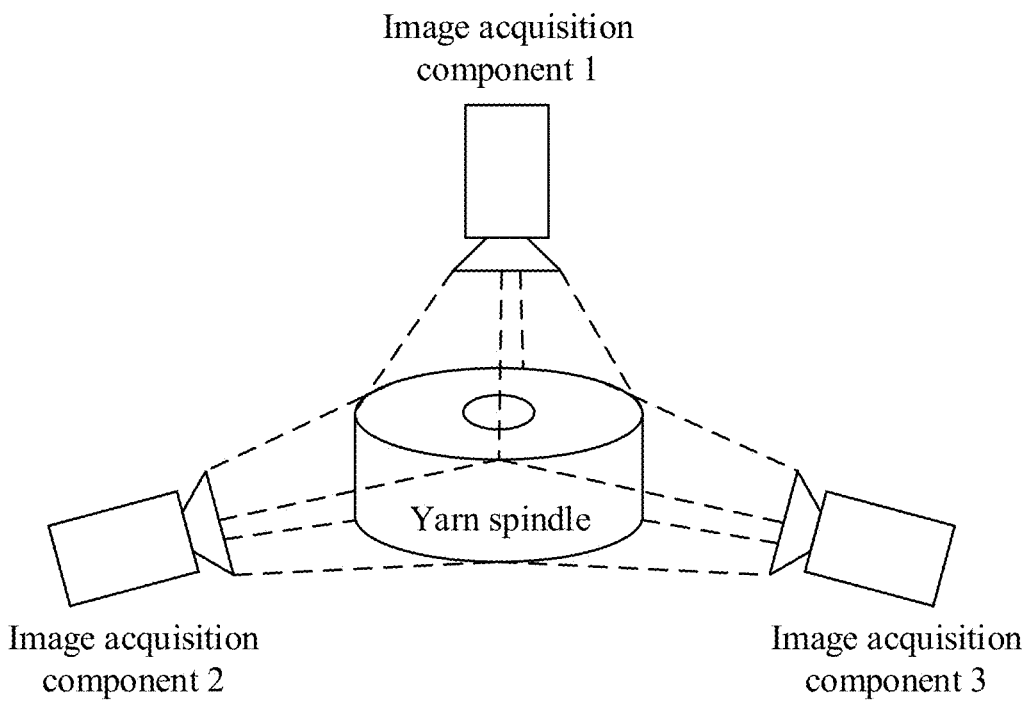
FIG. 3 is a schematic diagram of a scenario of image acquisition of a yarn spindle according to an embodiment of the present application.

The present disclosure will be described below in detail with reference to the accompanying drawings. The same reference numbers in the accompanying drawings represent elements with identical or similar functions. Although various aspects of the embodiments are shown in the accompanying drawings, the accompanying drawings are not necessarily drawn to scale unless specifically indicated.

In addition, in order to better illustrate the present disclosure, numerous details are given in the following exemplary implementations. Those having ordinary skill in the art should understand that the present disclosure may be performed without certain specific details. In some examples, methods, means, elements and circuits well known to those having ordinary skill in the art are not described in detail, in order to highlight the subject matter of the present disclosure.

The smallest product unit in the chemical fiber industry is a single yarn spindle. The single spindle data flow established based on the single yarn spindle achieves transparency of the whole production process of each yarn spindle.

The single spindle data flow means that a single yarn spindle being given a code (such as quick response (QR) code or barcode) docks with links such as automatic doffing, single spindle weighing, appearance detection, automatic packaging line and single spindle transportation through a physical transport device, so that relevant data of each yarn spindle can be collected and transmitted instantly and completely in each link. However, in the process of appearance detection of the single yarn spindle, it is usually necessary to manually perform defect detection on the yarn spindle and manually evaluate the actual level of the yarn spindle based on the detection result. This detection method is inefficient and has a strong dependence on manual experience. Therefore, there is an urgent need for an automated processing flow to efficiently identify defects in the yarn spindle and then re-evaluate the level of the yarn spindle.

Based on this, the present disclosure provides a method for processing yarn spindle data to solve the above problems.

Specifically, FIG. 1 is a first schematic flowchart of a method for processing yarn spindle data according to an embodiment of the present application. The method may be applied in electronic devices, such as personal computers, servers, server clusters and other electronic devices.

Further, the method includes at least a part of the following content. As shown in FIG. 1, the method includes the following steps.

Step S101: when determining that a yarn spindle transported enters a detection area, defect detection is performed on the yarn spindle located in the detection area to obtain a target detection result of the yarn spindle.

Here, the target detection result is used to characterize a defect degree of the yarn spindle.

Further, in an example, the main types of yarns in the yarn spindle may include one or more of Partially Oriented Yarns (POY), Fully Drawn Yarns (FDY), Draw Textured Yarns (DTY) (or called low-elastic yarns), etc. For example, the types of yarns may include Polyester Partially Oriented Yarns, Polyester Fully Drawn Yarns, Polyester Drawn Yarns, and/or Polyester Draw Textured Yarns, etc.

Further, in an example, the defect detection performed on the yarn spindle may refer to detection of the following defects: winding broken yarns, broken filament, oil stain, yarn tripping, knotting, damage of paper tube, tail yarns, or wrong color of paper tube, etc.

Step S102: when determining that the target detection result meets a preset defect requirement, a target level of the yarn spindle is obtained based on the target detection result of the yarn spindle and a preset level of the yarn spindle.

It should be pointed out that the preset level of the yarn spindle may be a preset highest level or other level. For example, in the downgrading scenario of the yarn spindle, the preset level of the yarn spindle is set to the highest level. At this time, it can be determined whether the preset level of the yarn spindle needs to be downgraded according to the target detection result of the yarn spindle. In practical applications, the preset level of the yarn spindle may be set according to the actual scenario requirements, and is not specifically limited in the present disclosure.

In this way, the present disclosure can use the target detection result of the yarn spindle to determine the target level of the yarn spindle. Specifically, the present disclosure firstly performs automatic defect detection on the appearance of the yarn spindle, and then accurately evaluates the actual level of the yarn spindle according to the actual defect situation of the yarn spindle (such as the target detection result), and then quickly adjusts the level of the yarn spindle, thus realizing a complete set of automated processing flow from the defect detection of the yarn spindle to the level evaluation of the yarn spindle. The present disclosure can efficiently detect defects in yarn spindles without relying on manual experience, and can automatically adjust the levels of the yarn spindles according to the detection results, thereby saving a lot of manpower and time costs, and further improving the management efficiency of the yarn spindles.

Further, the levels of the yarn spindles can be adjusted automatically, thus effectively improving the data quality of single spindle data, better realizing the quality control and feedback for the yarn spindles in the production process, and effectively avoiding possible losses to users.

FIG. 2 is a second schematic flowchart of a method for processing yarn spindle data according to an embodiment of the present application. The method may be applied in electronic devices, such as personal computers, servers, server clusters and other electronic devices. It can be understood that the relevant content of the method shown in FIG. 1 described above may also be applied to this example, and the relevant content will not be repeated in this example.

Further, the method includes at least a part of the following content. As shown in FIG. 2, the method includes:

Step S201: when determining that a yarn spindle transported enters a detection area, N images of the yarn spindle are obtained.

Here, an image in the N images includes at least a partial area of the yarn spindle, for example, the image may include a local area such as an upper surface, a lower surface or an annular surface (i.e., a side surface) of the yarn spindle.

Further, N is greater than or equal to 3 in an example.

Further, in an example, the following image acquisition method may be used to perform image acquisition on the yarn spindle; and specifically, step S201 may include: when obtaining response information of a radio frequency identifier corresponding to the yarn spindle (at this time, it can be considered that the yarn spindle has entered the detection area), using N image acquisition components to respectively perform image acquisition on the yarn spindle from different angles to obtain the N images. For example, as shown in FIG. 3, three image acquisition components are used to perform all-round image acquisition on the yarn spindle, where an image acquisition component 1 performs image acquisition on the upper surface of the yarn spindle, an image acquisition component 2 performs image acquisition on the left part of the lower surface of the yarn spindle and the left side surface of the yarn spindle, and an image acquisition component 3 performs image acquisition on the right part of the lower surface of the yarn spindle and the right side surface of the yarn spindle. In this way, it is convenient to carry out comprehensive defect detection on the yarn spindle, laying a foundation for subsequently improving the accuracy of defect detection on the yarn spindle.

Here, in an example, the image acquisition method of the yarn spindle may also be as follows: when determining that the yarn spindle is transported to the detection area, generating a control instruction, where the control instruction is used to instruct a mechanical gripper to grasp the yarn spindle and rotate the yarn spindle so that the image acquisition components can perform all-round image acquisition on the yarn spindle. Alternatively, other image acquisition methods may also be used. The present disclosure does not impose specific restrictions on the image acquisition method of the yarn spindle.

Step S202: the N images are input into a target detection model to obtain a first detection result corresponding to each of the N images.

Here, the target detection model is used to identify whether there are defects in a local area of the yarn spindle to obtain the first detection result; and the first detection result includes at least one of: the quantity of defects, positions of defects, or types of defects.

Step S203: the target detection result of the yarn spindle is obtained based on the first detection result corresponding to each of the N images.

Here, the target detection result is used to characterize a defect degree of the yarn spindle.

Step S204: whether the target detection result meets a preset defect requirement is determined. If so, proceed to step S205, otherwise proceed to step S206.

Step S205: when determining that the target detection result meets the preset defect requirement, a target level of the yarn spindle is obtained based on the target detection result of the yarn spindle and a preset level of the yarn spindle.

Step S206: when determining that the target detection result does not meet the preset defect requirement, the preset level of the yarn spindle is taken as the target level of the yarn spindle.

In this way, the present disclosure can use the model to perform defect detection on the yarn spindle, and then determine the target level of the yarn spindle based on the obtained detection result (such as target detection result), so that the actual level of the yarn spindle can be accurately evaluated, and the automatic adjustment of the level of the yarn spindle can be realized, thereby greatly improving the management efficiency of the yarn spindle. Also, since the present disclosure uses the model for defect detection, the efficient identification of defects in the yarn spindle is achieved, thereby greatly improving the accuracy in evaluating the level of the yarn spindle.

Further, in an example, the target detection model may be a dynamic weights-based wavelet attention Network (DWWA-Net) or may be any other model improved based on Dynamic Wavelet Convolution Networks (DWCNet), which is not specifically limited in the present disclosure.

Further, in an example, the target detection model includes at least a first network layer, a second network layer and a third network layer.

Specifically, the first network layer is used to perform feature processing on an input image to obtain a low-level feature map. For example, the first network layer may be a dynamic wavelet convolution network. Here, the low-level feature map is used to characterize a feature map extracted after filtering out the background noise in the image.

Further, the second network layer is used to perform feature enhancement on at least key feature information in the low-level feature map to obtain a high-level feature map. For instance, in an example, the second network layer may be used to enhance key feature information in the low-level feature map, and relatively, also suppress irrelevant feature information in the low-level feature map, such as suppressing feature information irrelevant to the yarn spindle, to obtain the high-level feature map.

Further, the third network layer is used to perform defect recognition based on the high-level feature map to obtain the first detection result.

In this way, the present disclosure provides an example of the model to perform rapid defect detection on yarn spindles. The present disclosure can achieve efficient detection of defects in yarn spindles without manual experience, and is especially capable of detecting weak defects that are difficult to detect in yarn spindles, thereby further improving the accuracy of detection and laying the foundation for the subsequent rapid evaluation of levels of yarn spindles.

In an example of the present disclosure, the first network layer may include at least a first sub-network layer, a second sub-network layer, a third sub-network layer and a fourth sub-network layer.

Here, the first sub-network layer is used to extract local features from the input image to obtain a low-frequency feature map; the second sub-network layer is used to obtain a target weight factor of the feature map of the input image; the third sub-network layer is used to extract global features from the input image to obtain a global feature map (for example, obtain a global feature map containing low-frequency information and high-frequency information); and the fourth sub-network layer is used to fuse the low-frequency feature map and the global feature map based on the target weight factor to filter out noise and obtain the low-level feature map. In other words, the first network layer can combine the extracted local feature information (such as the low-frequency feature map) with the global feature information (such as the global feature map) to obtain a feature map with higher quality, thus making it easier to capture feature information of defects, thereby improving the accuracy of defect detection and laying the foundation for the subsequent accurate evaluation of the level of the yarn spindle.

For example, in an example, the target weight factor determined by the second sub-network layer is denoted as w, the low-frequency feature map obtained by the first sub-network layer is denoted as p, the global feature map obtained by the third sub-network layer is denoted as q, and the low-level feature map obtained by the fourth sub-network layer is denoted as x. The expression is:

$$x = p \cdot w + q \cdot (1 - w).$$

In this way, the example of the present disclosure can utilize the obtained weight factor to appropriately combine the obtained local feature information with the global feature information, so that the noise existing in the feature map can be adjusted, facilitating alleviation of the interference of noise on defect detection, and thus improving the accuracy of defect detection.

In another example of the present disclosure, the second network layer includes at least a fifth sub-network layer, a sixth sub-network layer and a seventh sub-network layer.

Here, the fifth sub-network layer is used to extract features from the low-level feature map, and fuse a plurality of feature maps extracted to obtain M initial fused feature maps, where M is an integer greater than or equal to 2; the sixth sub-network layer is used to extract key features from each of the M initial fused feature maps, and perform feature enhancement on the key feature information extracted from each initial fused feature map to obtain M target enhanced feature maps; and the seventh sub-network layer is used to fuse the M target enhanced feature maps obtained to obtain the high-level feature map. In this way, the clear and rich feature information (for example, the high-level feature map) can be obtained, thereby improving the accuracy of defect detection. Especially for weak defects that are difficult to detect in yarn spindles, the detection accuracy of weak defects is significantly improved, laying the foundation for the subsequent accurate evaluation of levels of yarn spindles.

Figure 4:
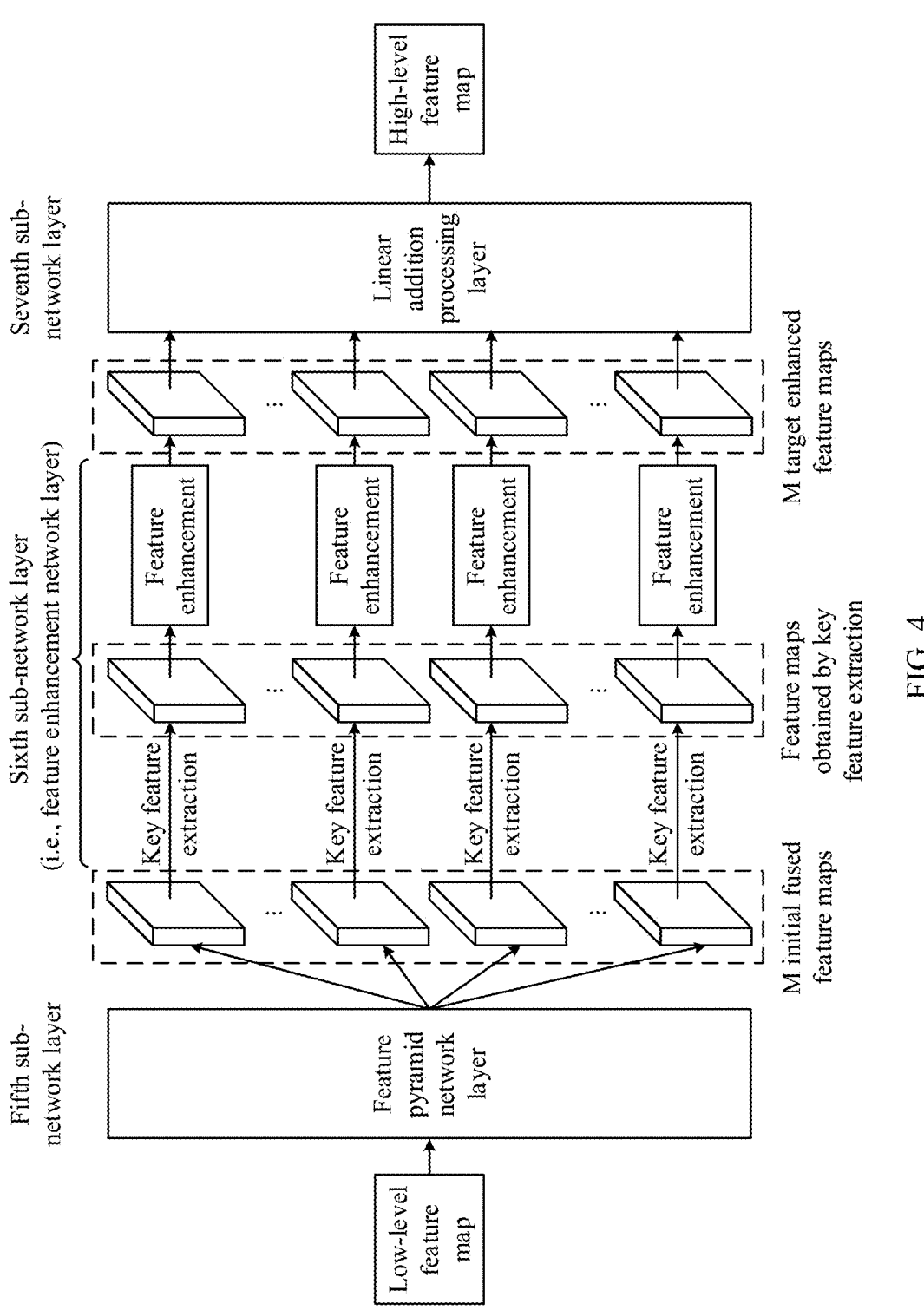
FIG. 4 is a structural schematic diagram of a second network layer in an example according to an embodiment of the present application.

For example, the fifth sub-network layer is a Feature Pyramid Network (FPN) layer, the sixth sub-network layer is a feature enhancement network layer, and the seventh sub-network layer is a linear Addition (Add) processing layer. As shown in FIG. 4, firstly the low-level feature map is input into the FPN layer to obtain M initial fused feature maps; secondly the obtained initial fused feature maps are input into the feature enhancement network layer, for example, the key features are extracted from the initial fused feature maps through the feature enhancement network layer, and the extracted feature maps are subjected to feature enhancement to obtain M target enhanced feature maps; and finally the obtained M target enhanced feature maps are input into a linear addition processing layer to obtain the high-level feature map. In this way, it is convenient to improve the detection accuracy of defects and weak defects, and provides a basis for the subsequent accurate evaluation of levels of yarn spindles.

Here, in an example, the i-th target enhanced feature map among the M target enhanced feature maps is obtained by:

convolving an i-th initial fused feature map to obtain an i-th weight factor based on a convolution processing result; fusing an (i+1)-th initial fused feature map with the i-th initial fused feature map based on the i-th weight factor to obtain an i-th target fused feature map; extracting key features from the obtained i-th target fused feature map, performing feature enhancement on a plurality of extracted feature maps respectively (for example, performing feature enhancement on different feature maps to corresponding degrees) to obtain a plurality of i-th initial enhanced feature maps, and fusing the plurality of i-th initial enhanced feature maps to obtain the i-th target enhanced feature map, where i is an integer greater than or equal to 1 and less than or equal to M−1.

Further, when i is M, the (M+1)-th initial fused feature map may be a preset value. At this time, the M-th target fused feature map can be obtained, and then the M-th target enhanced feature map can be obtained. Alternatively, the M-th target enhanced feature map may be obtained by:

extracting key features from the M-th initial fused feature map, enhancing a plurality of extracted feature maps respectively to obtain a plurality of M-th initial enhanced feature maps, and fusing the plurality of M-th initial enhanced feature maps to obtain the M-th target enhanced feature map.

Figure 5:
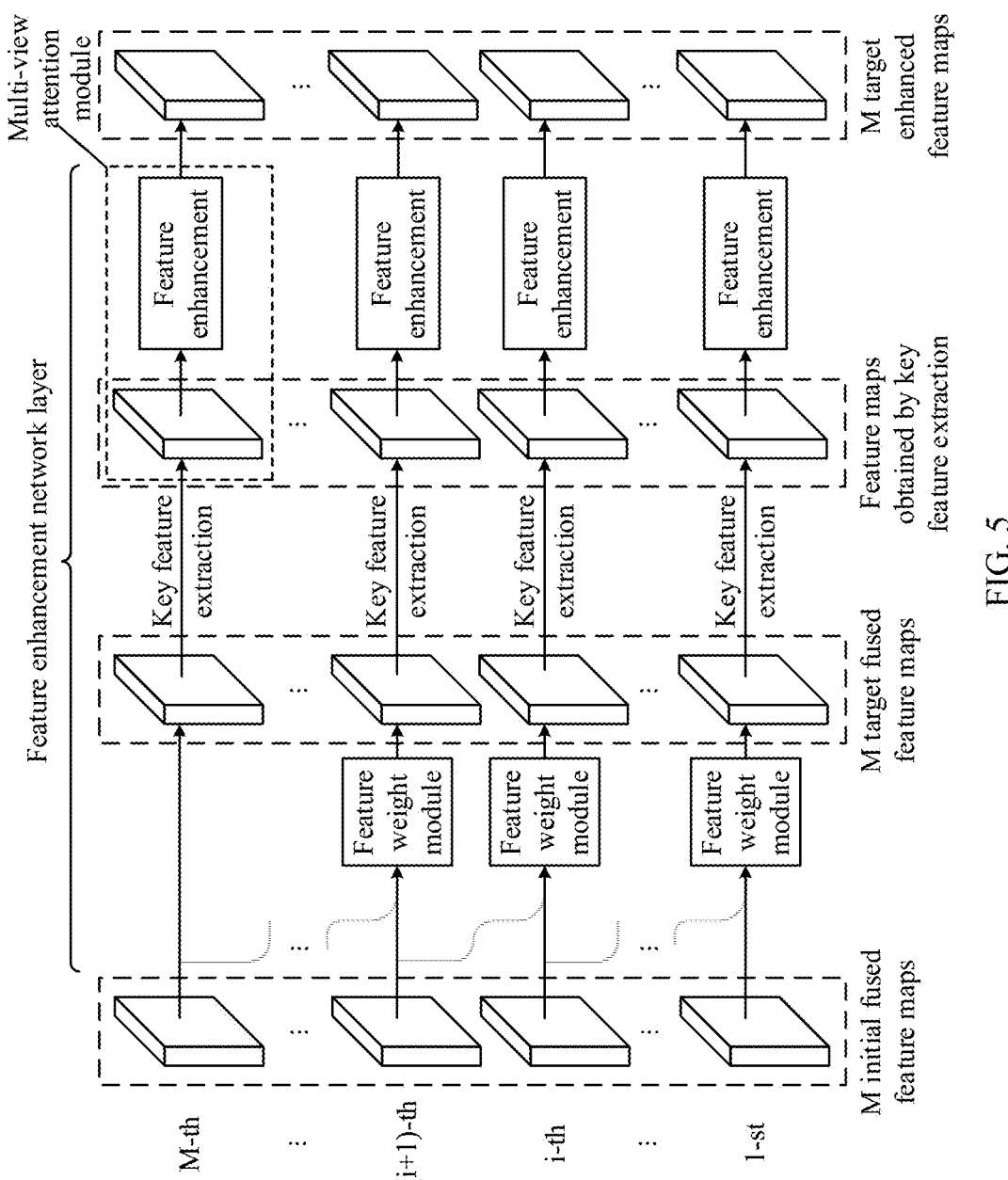
FIG. 5 is a structural schematic diagram of a sixth sub-network layer in a second network layer in an example according to an embodiment of the present application.

For example, continue to take the sixth sub-network layer being a feature enhancement network layer for example. At this time, the feature enhancement network layer may further include a feature weight module and a multi-view attention module. As shown in FIG. 5, the i-th initial fused feature map and the (i+1)-th initial fused feature map among the M initial fused feature maps are input into the feature weight module to obtain the i-th target fused feature map, and the i-th target fused feature map is input into the multi-view attention module to perform key feature extraction and feature enhancement to obtain the i-th target enhanced feature map. Furthermore, for the M-th initial fused feature map, the M-th initial fused feature map can be directly used as the M-th target fused feature map, and the obtained M-th target fused feature map is input into the multi-view attention module to perform key feature extraction and feature enhancement to obtain the M-th target enhanced feature map.

Figure 6:
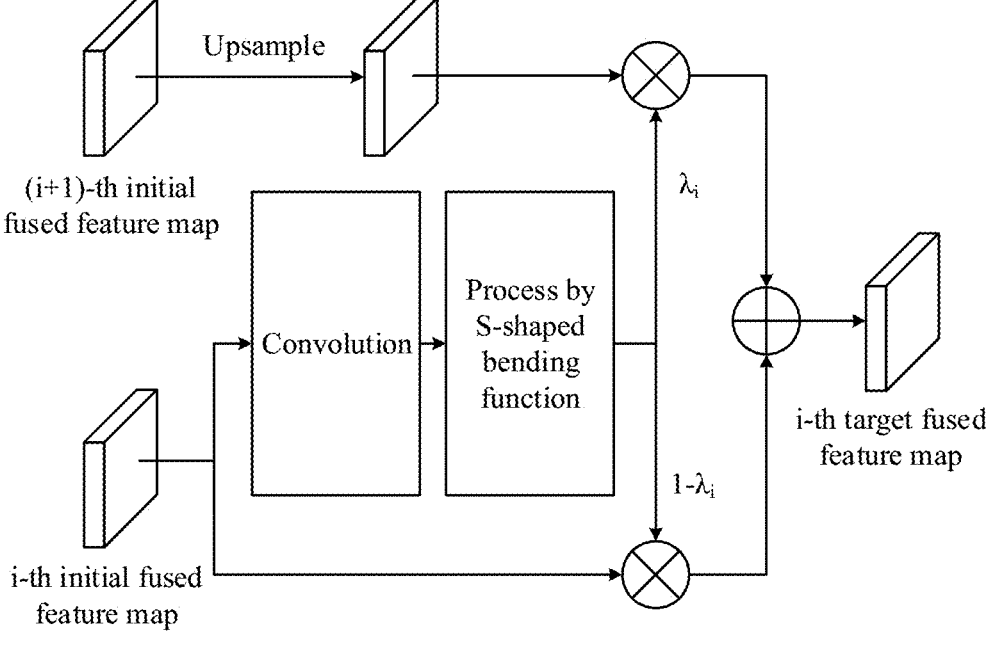
FIG. 6 is a structural schematic diagram of a feature weight module according to an embodiment of the present application.

Further, as shown in FIG. 6, the feature weight module is configured to: firstly upsample the (i+1)-th initial fused feature map to obtain the processed (i+1)-th initial fused feature map; convolve the i-th initial fused feature map, and process the obtained result by the S-shaped bending function (Sigmod) to obtain the i-th weight factor (such as $\lambda_i$ in the figure, or $1−\lambda_i$), secondly perform element multiplication of the i-th weight factor (such as $1−\lambda_i$) and the i-th initial fused feature map, perform element multiplication of $\lambda_i$ and the processed (i+1)-th initial fused feature map, and perform element addition of the obtained results to obtain the i-th target fused feature map. Here, when i is M, the M-th initial fused feature map does not need to be input into the feature weight module and can be directly used as the M-th target fused feature map.

Figure 7:
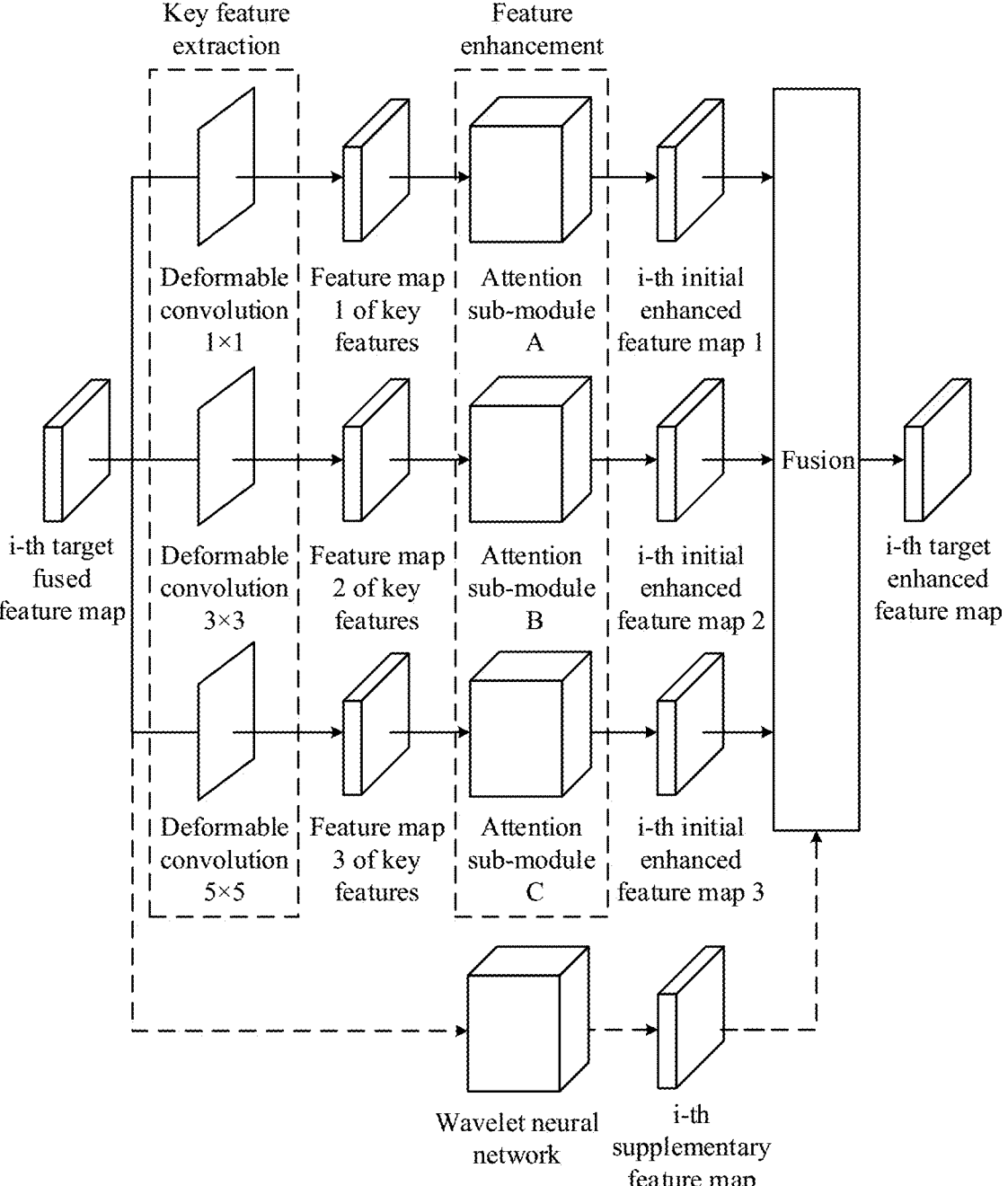
FIG. 7 is a structural schematic diagram of a multi-view attention module according to an embodiment of the present application.

Further, as shown in FIG. 7, the multi-view attention module is configured to: firstly perform deformable convolution of a first preset convolution kernel (for example, 1×1) on the i-th target fused feature map to extract key features and obtain a feature map 1 of the key features, perform deformable convolution of a second preset convolution kernel (for example, 3×3) on the i-th target fused feature map to obtain a feature map 2 of key features, and perform deformable convolution of a third preset convolution kernel (for example, 5×5) on the i-th target fused feature map to obtain a feature map 3 of key features; secondly input the obtained feature map 1 into the attention submodule A to enhance the feature map 1 and obtain the i-th initial enhanced feature map 1, and similarly, input the feature map 2 into the attention submodule B to obtain the i-th initial enhanced feature map 2, and input the feature map 3 into the attention submodule C to obtain the i-th initial enhanced feature map 3; and finally fuse the three i-th initial enhanced feature maps (for example, element addition) to obtain the i-th target enhanced feature map.

Further, based on FIG. 7, a neural network may be added. For example, a wavelet neural network is added, to utilize the wavelet neural network to directly perform feature extraction on the i-th target fused feature map to obtain the i-th supplementary feature map, and fuse it with the three i-th initial enhanced feature maps described above.

It should be pointed out that the structure in the attention sub-module (such as attention sub-module A, or attention sub-module B, or attention sub-module C) contained in the multi-view attention module may be a Squeeze and Excitation (SE) network or may be any other network structure obtained based on the SE network, which is not limited in the present disclosure.

In this way, the example of the present disclosure can make full use of the sixth sub-network layer to extract key features from the low-level feature map and perform feature enhancement on the extracted result, thus directing the network attention to a potential objective (i.e., defects in the yarn spindle), and facilitating the subsequent better defect identification. Especially for weak defects that are difficult to detect in yarn spindles, the key features of weak defects can be obtained more comprehensively, thereby improving the detection accuracy of weak defects, and laying the foundation for subsequent accurate evaluation of levels of yarn spindles.

In yet another example of the present disclosure, the third network layer includes an eighth sub-network layer and a ninth sub-network layer.

Here, the eighth sub-network layer is used to select a candidate area of a suspected defect in the image based on the high-level feature map; and the ninth sub-network layer is used to identify whether there is a defect in the candidate area based on the high-level feature map and the selected candidate area. In this way, possible defects in yarn spindles can be efficiently identified, laying the foundation for subsequent accurate evaluation and automatic adjustment of levels of yarn spindles.

Figure 8:
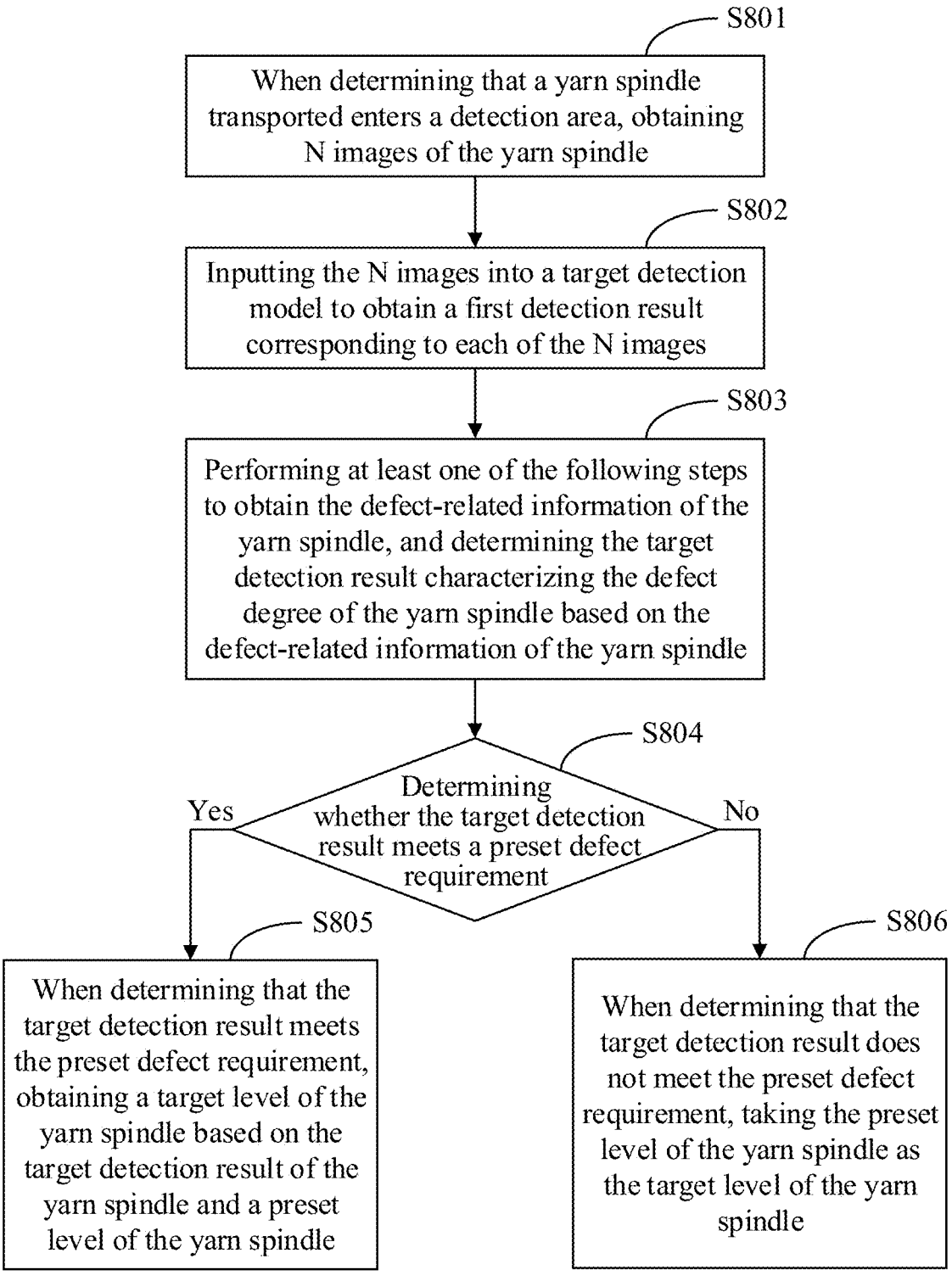
FIG. 8 is a third schematic flowchart of a method for processing yarn spindle data according to an embodiment of the present application.

FIG. 8 is a third schematic flowchart of a method for processing yarn spindle data according to an embodiment of the present application. The method may be applied in electronic devices, such as personal computers, servers, server clusters and other electronic devices. It can be understood that the relevant content of the method shown in FIG. 1 and FIG. 2 described above may also be applied to the example, and the relevant content will not be repeated in the example.

Further, the method includes at least a part of the following content. As shown in FIG. 8, the method includes the following steps.

Step S801: when determining that a yarn spindle transported enters a detection area, N images of the yarn spindle are obtained; where an image in the N images includes at least a partial area of the yarn spindle, and N is greater than or equal to 3.

Step S802: the N images are input into a target detection model to obtain a first detection result corresponding to each of the N images.

Here, the target detection model is used to identify whether there are defects in a local area of the yarn spindle to obtain the first detection result; and the first detection result includes at least one of: a quantity of defects, positions of defects, or types of defects.

Step S803: at least one of the following steps is performed to obtain the defect-related information of the yarn spindle, and the target detection result characterizing the defect degree of the yarn spindle is determined based on the defect-related information of the yarn spindle:

(1) counting a quantity of defects included in each of N first detection results to obtain a total quantity of defects of the yarn spindle;

(2) obtaining all defect positions (for example, obtaining the total defect size) in the yarn spindle based on defect positions (for example, including positions and defect sizes) included in each of the N first detection results; or (3) obtaining a target defect type (for example, the target defect type includes defect types contained in all the first detection results) of the yarn spindle based on defect types included in each of the N first detection results.

Step S804: whether the target detection result meets a preset defect requirement is determined. If so, proceed to step S805, otherwise proceed to step S806.

Step S805: when determining that the target detection result meets the preset defect requirement, a target level of the yarn spindle is obtained based on the target detection result of the yarn spindle and a preset level of the yarn spindle.

Further, in an example, the target level of the yarn spindle may be obtained in the following manner, so that the level of the yarn spindle can be automatically adjusted thereby greatly improving the management efficiency of the yarn spindle, thus ensuring the data quality of the single spindle data; and specifically, the above-mentioned step of, when determining that the target detection result meets the preset defect requirement, obtaining the target level of the yarn spindle based on the target detection result of the yarn spindle and the preset level of the yarn spindle (for example, the above-mentioned step S805) includes:

downgrading the preset level of the yarn spindle to obtain the target level of the detected yarn spindle when determining that at least one of the followings is satisfied:

condition 1: the total quantity of defects of the yarn spindle in the target detection result being greater than a preset threshold;

condition 2: a defect position among all the defect positions in the yarn spindle in the target detection result being within a preset defect position range (for example, the total defect size is within the preset defect position range and exceeds a preset area); or condition 3: the target defect type of the yarn spindle in the target detection result being within a preset defect type range (for example, if the target defect type includes defect types contained in all the first detection result, there is at least one defect type falling into the preset defect type range, and the target defect type can be considered to be within the preset defect type range).

Step S806: when determining that the target detection result does not meet the preset defect requirement, the preset level of the yarn spindle is taken as the target level of the yarn spindle.

In this way, the example of the present disclosure can use the model to perform defect detection on the yarn spindle, and determine the level of the yarn spindle based on the detection result (such as target detection result), so that the level of the yarn spindle can be automatically adjusted, thereby greatly improving the management efficiency of the yarn spindle, thus ensuring the data quality of the single spindle data and effectively avoiding possible losses to users.

In summary, the present disclosure provides the following advantages, including:

1) Realize automated processing: the example of the present disclosure can efficiently detect defects in yarn spindles without relying on manual experience, and can automatically adjust the levels of the yarn spindles according to the detection results, thereby saving a lot of manpower and time costs, and further improving the management efficiency of the yarn spindles.

2) Improve detection accuracy: traditional manual detection methods are difficult to detect appearance defects in yarn spindles and are prone to missed detection; and the example of the present disclosure uses the neural network model that is more suitable for defect detection, and has the higher detection accuracy especially for weak defects that are difficult to detect, thus ensuring the quality of the yarn spindles.

3) Improve quality of single spindle data: in the application process of single-spindle data stream, the example of the present disclosure further improves the data quality of a single yarn spindle in terms of appearance defect detection of the single yarn spindle, thereby better realizing the quality control and feedback for yarn spindles in the production process, and effectively avoiding possible losses to users.

Figures 9, 10:
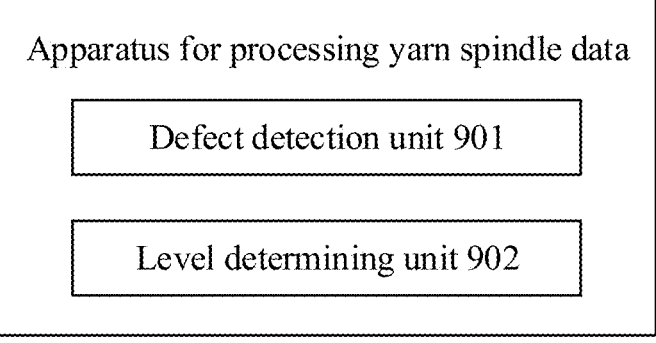
FIG. 9 is a structural schematic diagram of an apparatus for processing yarn spindle data according to an embodiment of the present application.
FIG. 10 is a block diagram of an electronic device used to implement the method for processing yarn spindle data according to an embodiment of the present disclosure.

The present disclosure further provides an apparatus for processing yarn spindle data, as shown in FIG. 9, including:

a defect detection unit 901 configured to, when determining that a yarn spindle transported enters a detection area, perform defect detection on the yarn spindle located in the detection area to obtain a target detection result of the yarn spindle; where the target detection result is used to characterize a defect degree of the yarn spindle; and a level determining unit 902 configured to, when determining that the target detection result meets a preset defect requirement, obtain a target level of the yarn spindle based on the target detection result of the yarn spindle and a preset level of the yarn spindle.

In an example of the present disclosure, the defect detection unit 901 is configured to:

obtain N images of the yarn spindle; where an image in the N images includes at least a partial area of the yarn spindle, and N is greater than or equal to 3;

input the N images into a target detection model to obtain a first detection result corresponding to each of the N images; where the target detection model is used to identify whether there are defects in a local area of the yarn spindle to obtain the first detection result; and the first detection result includes at least one of: a quantity of defects, positions of defects, or types of defects; and obtain the target detection result of the yarn spindle based on the first detection result corresponding to each of the N images.

In an example of the present disclosure, the defect detection unit 901 is configured to:

perform at least one of following steps to obtain defect-related information of the yarn spindle, and determine the target detection result characterizing the defect degree of the yarn spindle based on the defect-related information of the yarn spindle:

counting a quantity of defects included in each of N first detection results to obtain a total quantity of defects of the yarn spindle;

obtaining all defect positions in the yarn spindle based on defect positions included in each of the N first detection results; or obtaining a target defect type of the yarn spindle based on defect types included in each of the N first detection results.

In an example of the present disclosure, the level determining unit 902 is configured to:

downgrade the preset level of the yarn spindle to obtain the target level of the detected yarn spindle when determining that at least one of the followings is satisfied:

the total quantity of defects of the yarn spindle in the target detection result being greater than a preset threshold;

a defect position among all the defect positions in the yarn spindle in the target detection result being within a preset defect position range; or the target defect type of the yarn spindle in the target detection result being within a preset defect type range.

In an example of the present disclosure, the target detection model includes at least a first network layer, a second network layer and a third network layer;

the first network layer is used to perform feature processing on an input image to obtain a low-level feature map, where the low-level feature map is used to characterize a feature map extracted after filtering out background noise in the image;

the second network layer is used to perform feature enhancement on at least key feature information in the low-level feature map to obtain a high-level feature map; and the third network layer is used to perform defect recognition based on the high-level feature map to obtain a first detection result.

In an example of the present disclosure, the first network layer includes at least a first sub-network layer, a second sub-network layer, a third sub-network layer and a fourth sub-network layer;

where the first sub-network layer is used to extract local features from the input image to obtain a low-frequency feature map; the second sub-network layer is used to obtain a target weight factor of the feature map of the input image; the third sub-network layer is used to extract global features from the input image to obtain a global feature map; and the fourth sub-network layer is used to fuse the low-frequency feature map and the global feature map based on the target weight factor to filter out noise and obtain the low-level feature map.

In an example of the present disclosure, the second network layer includes at least a fifth sub-network layer, a sixth sub-network layer and a seventh sub-network layer;

where the fifth sub-network layer is used to extract features from the low-level feature map, and fuse a plurality of feature maps extracted to obtain M initial fused feature maps, where M is an integer greater than or equal to 2;

the sixth sub-network layer is used to extract key features from each of the M initial fused feature maps, and perform feature enhancement on key feature information extracted from each initial fused feature map to obtain M target enhanced feature maps; and the seventh sub-network layer is used to fuse the M target enhanced feature maps obtained to obtain the high-level feature map.

In an example of the present disclosure, an i-th target enhanced feature map among the M target enhanced feature maps is obtained by:

convolving an i-th initial fused feature map to obtain an i-th weight factor based on a convolution processing result; fusing an (i+1)-th initial fused feature map with the i-th initial fused feature map based on the i-th weight factor to obtain an i-th target fused feature map; extracting key features from the obtained i-th target fused feature map, performing feature enhancement on a plurality of extracted feature maps respectively to obtain a plurality of i-th initial enhanced feature maps, and fusing the plurality of i-th initial enhanced feature maps to obtain the i-th target enhanced feature map; where i is an integer greater than or equal to 1 and less than or equal to M−1; when i is M, extracting key features from an M-th initial fused feature map, performing feature enhancement on a plurality of extracted feature maps respectively to obtain a plurality of M-th initial enhanced feature maps, and fusing the plurality of M-th initial enhanced feature maps to obtain an M-th target enhanced feature map.

For the description of functions and examples of the units of the apparatus of the embodiment of the present disclosure, reference may be made to the relevant description of the corresponding steps in the above-mentioned method embodiments, which are not repeated here.

In the present disclosure, the acquisition, storage and application of the user's personal information involved are in compliance with relevant laws and regulations, and do not violate public order and good customs.

FIG. 10 is a structural block diagram of an electronic device according to an embodiment of the present disclosure. As shown in FIG. 10, the electronic device includes: a memory 1010 and a processor 1020, and the memory 1010 stores a computer program that can run on the processor 1020. There may be one or more memories 1010 and processors 1020. The memory 1010 may store one or more computer programs, and the one or more computer programs cause the electronic device to perform the method provided in the above method embodiment, when executed by the electronic device. The electronic device may also include: a communication interface 1030 configured to communicate with an external device for data interactive transmission.

If the memory 1010, the processor 1020 and the communication interface 1030 are implemented independently, the memory 1010, the processor 1020 and the communication interface 1030 may be connected to each other and complete communication with each other via a bus. The bus may be an Industry Standard Architecture (ISA) bus, a Peripheral Component Interconnect (PCI) bus, or an Extended Industry Standard Architecture (EISA) bus, etc. The bus may be divided into address bus, data bus, control bus, etc. For ease of representation, the buses are represented by only one thick line in FIG. 10, but it does not represent only one bus or only one type of bus.

Additionally and/or alternatively, in an exemplary implementation, if the memory 1010, the processor 1020 and the communication interface 1030 are integrated on one chip, the memory 1010, the processor 1020 and the communication interface 1030 may communicate with each other via an internal interface.

It should be understood that the above-mentioned processor may be a Central Processing Unit (CPU) or other general-purpose processor, a Digital Signal Processor (DSP), an Application Specific Integrated Circuit (ASIC), a Field Programmable Gate Array (FPGA) or other programmable logic device, a discrete gate or transistor logic device, a discrete hardware component, etc. The general-purpose processor may be a microprocessor or any conventional processor, etc. It is worth noting that the processor may be a processor that supports the Advanced RISC Machines (ARM) architecture.

Further, the above-mentioned memory may include a read-only memory and a random access memory, and may also include a non-volatile random access memory. The memory may be a volatile memory or a non-volatile memory, or may include both a volatile memory and a non-volatile memory. Here, the non-volatile memory may include a Read-Only Memory (ROM), a Programmable ROM (PROM), an Erasable PROM (EPROM), an Electrically EPROM (EEPROM) or a flash memory. The volatile memory may include a Random Access Memory (RAM), which acts as an external cache. By way of illustration and not limitation, many forms of RAMs are available, for example, Static RAM (SRAM), Dynamic Random Access Memory (DRAM), Synchronous DRAM (SDRAM), Double Data Rate SDRAM (DDR SDRAM), Enhanced SDRAM (ESDRAM), Synchlink DRAM (SLDRAM) and Direct RAMBUS RAM (DR RAM).

The above embodiments may be implemented in whole or in part by software, hardware, firmware or any combination thereof. When implemented by software, they may be implemented in the form of a computer program product in whole or in part. The computer program product includes one or more computer instructions. When the computer instructions are loaded and executed on a computer, the processes or functions described in the embodiments of the present disclosure are generated in whole or in part. The computer may be a general-purpose computer, a special-purpose computer, a computer network, or other programmable device. The computer instructions may be stored in a computer readable storage medium or transmitted from a computer readable storage medium to another computer readable storage medium. For example, the computer instructions may be transmitted from a website, computer, server or data center to another website, computer, server or data center in a wired (e.g., coaxial cable, optical fiber, Digital Subscriber Line (DSL)) or wireless (e.g., infrared, Bluetooth, microwave, etc.) way. The computer readable storage medium may be any available medium that can be accessed by a computer, or a data storage device such as server or data center that is integrated with one or more available media. The available media may be magnetic media (for example, floppy disk, hard disk, magnetic tape), optical media (for example, Digital Versatile Disc (DVD)), or semiconductor media (for example, Solid State Disk (SSD)), etc. It is worth noting that the computer readable storage medium mentioned in the present disclosure may be a non-volatile storage medium, in other words, may be a non-transitory storage medium.

Those having ordinary skill in the art can understand that all or some of the steps for implementing the above embodiments may be completed by hardware, or may be completed by instructing related hardware through a program. The program may be stored in a computer readable storage medium. The above-mentioned storage medium may be a read-only memory, a magnetic disk or an optical disk, etc.

In the description of the embodiments of the present disclosure, the description with reference to the terms "one embodiment", "some embodiments", "example", "specific example" or "some examples", etc. means that specific features, structures, materials or characteristics described in conjunction with the embodiment or example are included in at least one embodiment or example of the present disclosure. Moreover, the specific features, structures, materials or characteristics described may be combined in a suitable manner in any one or more embodiments or examples. In addition, those skilled in the art can integrate and combine different embodiments or examples and features of different embodiments or examples described in this specification without conflicting with each other.

In the description of the embodiments of the present disclosure, "/" represents or, unless otherwise specified. For example, A/B may represent A or B. The term "and/or" herein only describes an association relation of associated objects, which indicates that there may be three kinds of relations, for example, A and/or B may indicate that only A exists, or both A and B exist, or only B exists.

In the description of the embodiments of the present disclosure, the terms "first" and "second" are only for purpose of description, and cannot be construed to indicate or imply the relative importance or implicitly point out the quantity of features indicated. Therefore, the feature defined with "first" or "second" may explicitly or implicitly include one or more features. In the description of the embodiments of the present disclosure, "multiple" means two or more, unless otherwise specified.

The above descriptions are only exemplary embodiments of the present disclosure and not intended to limit the present disclosure. Any modifications, equivalent replacements, improvements and others made within the spirit and principle of the present disclosure shall be contained in the protection scope of the present disclosure.

What is claimed is:

1. A method for processing yarn spindle data, comprising:
based on determining that a yarn spindle is transported into a detection area, performing a defect detection on the yarn spindle located in the detection area to obtain a target detection result of the yarn spindle, wherein the target detection result characterizes a defect degree of the yarn spindle; and
based on determining that the target detection result meets a preset defect value, obtaining a target level of the yarn spindle based on the target detection result of the yarn spindle and a preset level of the yarn spindle;
wherein the performing the defect detection on the yarn spindle located in the detection area to obtain the target detection result of the yarn spindle, comprises:
obtaining N images of the yarn spindle, wherein one image of the N images comprises at least a partial area of the yarn spindle, and N is greater than or equal to 3;
inputting the N images into a target detection model to obtain a first detection result corresponding to each of the N images, wherein the target detection model is used to identify whether there are defects in a local area of the yarn spindle to obtain the first detection result, and the first detection result comprises at least one of: a quantity of defects, positions of defects, or types of defects; and
obtaining the target detection result of the yarn spindle based on the first detection result corresponding to each of the N images;
wherein the target detection model comprises at least a first network layer, a second network layer and a third network layer,
wherein the first network layer is used to perform feature processing on an input image to obtain a low-level feature map, wherein the low-level feature map characterizes a feature map extracted after filtering out background noise in the input image, the second network layer is used to perform feature enhancement on at least key feature information in the low-level feature map to obtain a high-level feature map, and
the third network layer is used to perform defect recognition based on the high-level feature map to obtain the first detection result;
wherein the second network layer comprises at least a fifth sub-network layer, a sixth sub-network layer and a seventh sub-network layer,
wherein the fifth sub-network layer is used to extract features from the low-level feature map, and fuse a plurality of feature maps extracted to obtain M initial fused feature maps, wherein M is an integer greater than or equal to 2,
the sixth sub-network layer is used to extract key features from each of the M initial fused feature maps, and perform feature enhancement on key feature information extracted from each of the M initial fused feature maps to obtain M target enhanced feature maps, and
the seventh sub-network layer is used to fuse the obtained M target enhanced feature maps to obtain the high-level feature map;
wherein an i-th target enhanced feature map among the M target enhanced feature maps is obtained by:
convolving an i-th initial fused feature map to obtain an i-th weight factor based on a convolution processing result; fusing an (i+1)-th initial fused feature map with the i-th initial fused feature map based on the i-th weight factor to obtain an i-th target fused feature map; extracting key features from the obtained i-th target fused feature map, performing feature enhancement on a plurality of extracted feature maps respectively to obtain a plurality of i-th initial enhanced feature maps; and fusing the plurality of i-th initial enhanced feature maps to obtain the i-th target enhanced feature map, wherein i is an integer greater than or equal to 1 and less than or equal to M−1; and
based on i being equal to M, extracting key features from an M-th initial fused feature map; performing feature enhancement on a plurality of extracted feature maps respectively to obtain a plurality of M-th initial enhanced feature maps; and fusing the plurality of M-th initial enhanced feature maps to obtain an M-th target enhanced feature map.

2. The method of claim 1, wherein the obtaining the target detection result of the yarn spindle based on the first detection result corresponding to each of the N images, comprises:
performing at least one of following steps to obtain defect-related information of the yarn spindle, and determining the target detection result characterizing the defect degree of the yarn spindle based on the defect-related information of the yarn spindle:
counting a quantity of defects in each of N first detection results to obtain a total quantity of defects of the yarn spindle;
obtaining defect positions in the yarn spindle based on defect positions in each of the N first detection results; or
obtaining a target defect type of the yarn spindle based on defect types in each of the N first detection results.

3. The method of claim 2, wherein, based on determining that the target detection result meets the preset defect value, the obtaining the target level of the yarn spindle based on the target detection result of the yarn spindle and the preset level of the yarn spindle comprises:

downgrading the preset level of the yarn spindle to obtain the target level of the detected yarn spindle based on determining that at least one of the following is satisfied:

the total quantity of defects of the yarn spindle in the target detection result being greater than a preset threshold;

a defect position among the defect positions in the yarn spindle in the target detection result being within a preset defect position range; or the target defect type of the yarn spindle in the target detection result being within a preset defect type range.

4. The method of claim 1, wherein the first network layer comprises at least a first sub-network layer, a second sub-network layer, a third sub-network layer and a fourth sub-network layer, wherein the first sub-network layer is used to extract local features from the input image to obtain a low-frequency feature map, the second sub-network layer is used to obtain a target weight factor of the feature map of the input image, the third sub-network layer is used to extract global features from the input image to obtain a global feature map, and the fourth sub-network layer is used to fuse the low-frequency feature map and the global feature map based on the target weight factor to filter out noise and obtain the low-level feature map.

5. An electronic device, comprising:

at least one processor; and a memory storing an instruction that, when executed by the at least one processor, causes the electronic device to:

based on determining that a yarn spindle is transported into a detection area, perform a defect detection on the yarn spindle located in the detection area to obtain a target detection result of the yarn spindle, wherein the target detection result characterizes a defect degree of the yarn spindle; and based on determining that the target detection result meets a preset defect value, obtain a target level of the yarn spindle based on the target detection result of the yarn spindle and a preset level of the yarn spindle;

wherein the instruction, when executed by the at least one processor, causes the electronic device to perform the defect detection on the yarn spindle located in the detection area to obtain the target detection result of the yarn spindle by:

obtaining N images of the yarn spindle, wherein one image of the N images comprises at least a partial area of the yarn spindle, and N is greater than or equal to 3;

inputting the N images into a target detection model to obtain a first detection result corresponding to each of the N images, wherein the target detection model is used to identify whether there are defects in a local area of the yarn spindle to obtain the first detection result, and the first detection result comprises at least one of: a quantity of defects, positions of defects, or types of defects; and obtaining the target detection result of the yarn spindle based on the first detection result corresponding to each of the N images;

wherein the target detection model comprises at least a first network layer, a second network layer and a third network layer;

wherein the first network layer is used to perform feature processing on an input image to obtain a low-level feature map, wherein the low-level feature map characterizes a feature map extracted after filtering out background noise in the input image, the second network layer is used to perform feature enhancement on at least key feature information in the low-level feature map to obtain a high-level feature map, and the third network layer is used to perform defect recognition based on the high-level feature map to obtain the first detection result;

wherein the second network layer comprises at least a fifth sub-network layer, a sixth sub-network layer and a seventh sub-network layer, wherein the fifth sub-network layer is used to extract features from the low-level feature map, and fuse a plurality of feature maps extracted to obtain M initial fused feature maps, wherein M is an integer greater than or equal to 2, the sixth sub-network layer is used to extract key features from each of the M initial fused feature maps, and perform feature enhancement on key feature information extracted from each of the M initial fused feature maps to obtain M target enhanced feature maps, and the seventh sub-network layer is used to fuse the obtained M target enhanced feature maps to obtain the high-level feature map;

wherein an i-th target enhanced feature map among the M target enhanced feature maps is obtained by:

convolving an i-th initial fused feature map to obtain an i-th weight factor based on a convolution processing result; fusing an (i+1)-th initial fused feature map with the i-th initial fused feature map based on the i-th weight factor to obtain an i-th target fused feature map; extracting key features from the obtained i-th target fused feature map, performing feature enhancement on a plurality of extracted feature maps respectively to obtain a plurality of i-th initial enhanced feature maps; and fusing the plurality of i-th initial enhanced feature maps to obtain the i-th target enhanced feature map, wherein i is an integer greater than or equal to 1 and less than or equal to $M-1$; and based on i being equal to M, extracting key features from an M-th initial fused feature map; performing feature enhancement on a plurality of extracted feature maps respectively to obtain a plurality of M-th initial enhanced feature maps; and fusing the plurality of M-th initial enhanced feature maps to obtain an M-th target enhanced feature map.

6. The electronic device of claim 5, wherein the instruction, when executed by the at least one processor, causes the electronic device to obtain the target detection result of the yarn spindle based on the first detection result corresponding to each of the N images by:

performing at least one of following steps to obtain defect-related information of the yarn spindle, and determining the target detection result characterizing the defect degree of the yarn spindle based on the defect-related information of the yarn spindle:

counting a quantity of defects in each of N first detection results to obtain a total quantity of defects of the yarn spindle;

obtaining defect positions in the yarn spindle based on defect positions in each of the N first detection results; or obtaining a target defect type of the yarn spindle based on defect types in each of the N first detection results.

7. The electronic device of claim 6, wherein the instruction, when executed by the at least one processor, causes the electronic device to, based on determining that the target detection result meets the preset defect value, obtain the target level of the yarn spindle based on the target detection result of the yarn spindle and the preset level of the yarn spindle by:

downgrading the preset level of the yarn spindle to obtain the target level of the detected yarn spindle based on determining that at least one of the following is satisfied:

the total quantity of defects of the yarn spindle in the target detection result being greater than a preset threshold;

a defect position among the defect positions in the yarn spindle in the target detection result being within a preset defect position range; or the target defect type of the yarn spindle in the target detection result being within a preset defect type range.

8. The electronic device of claim 5, wherein the first network layer comprises at least a first sub-network layer, a second sub-network layer, a third sub-network layer and a fourth sub-network layer, wherein the first sub-network layer is used to extract local features from the input image to obtain a low-frequency feature map, the second sub-network layer is used to obtain a target weight factor of the feature map of the input image, the third sub-network layer is used to extract global features from the input image to obtain a global feature map, and the fourth sub-network layer is used to fuse the low-frequency feature map and the global feature map based on the target weight factor to filter out noise and obtain the low-level feature map.

9. A non-transitory computer-readable storage medium storing an instruction that, when executed, causes a computing device to:

based on determining that a yarn spindle is transported into a detection area, perform a defect detection on the yarn spindle located in the detection area to obtain a target detection result of the yarn spindle, wherein the target detection result characterizes a defect degree of the yarn spindle; and based on determining that the target detection result meets a preset defect value, obtain a target level of the yarn spindle based on the target detection result of the yarn spindle and a preset level of the yarn spindle;

wherein the instruction, when executed, causes the computing device to perform the defect detection on the yarn spindle located in the detection area to obtain the target detection result of the yarn spindle by:

obtaining N images of the yarn spindle, wherein one image of the N images comprises at least a partial area of the yarn spindle, and N is greater than or equal to 3;

inputting the N images into a target detection model to obtain a first detection result corresponding to each of the N images, wherein the target detection model is used to identify whether there are defects in a local area of the yarn spindle to obtain the first detection result, and the first detection result comprises at least one of: a quantity of defects, positions of defects, or types of defects; and obtaining the target detection result of the yarn spindle based on the first detection result corresponding to each of the N images;

wherein the target detection model comprises at least a first network layer, a second network layer and a third network layer, wherein the first network layer is used to perform feature processing on an input image to obtain a low-level feature map, wherein the low-level feature map characterizes a feature map extracted after filtering out background noise in the input image, the second network layer is used to perform feature enhancement on at least key feature information in the low-level feature map to obtain a high-level feature map, and the third network layer is used to perform defect recognition based on the high-level feature map to obtain the first detection result;

wherein the second network layer comprises at least a fifth sub-network layer, a sixth sub-network layer and a seventh sub-network layer, wherein the fifth sub-network layer is used to extract features from the low-level feature map, and fuse a plurality of feature maps extracted to obtain M initial fused feature maps, wherein M is an integer greater than or equal to 2, the sixth sub-network layer is used to extract key features from each of the M initial fused feature maps, and perform feature enhancement on key feature information extracted from each of the M initial fused feature maps to obtain M target enhanced feature maps, and the seventh sub-network layer is used to fuse the obtained M target enhanced feature maps to obtain the high-level feature map;

wherein an i-th target enhanced feature map among the M target enhanced feature maps is obtained by:

convolving an i-th initial fused feature map to obtain an i-th weight factor based on a convolution processing result; fusing an $(i+1)$-th initial fused feature map with the i-th initial fused feature map based on the i-th weight factor to obtain an i-th target fused feature map; extracting key features from the obtained i-th target fused feature map, performing feature enhancement on a plurality of extracted feature maps respectively to obtain a plurality of i-th initial enhanced feature maps; and fusing the plurality of i-th initial enhanced feature maps to obtain the i-th target enhanced feature map, wherein i is an integer greater than or equal to 1 and less than or equal to $M-1$; and based on i being equal to M, extracting key features from an M-th initial fused feature map;

performing feature enhancement on a plurality of extracted feature maps respectively to obtain a plurality of M-th initial enhanced feature maps; and fusing the plurality of M-th initial enhanced feature maps to obtain an M-th target enhanced feature map.

10. The non-transitory computer-readable storage medium of claim 9, wherein the instruction, when executed, causes the computing device to obtain the target detection result of the yarn spindle based on the first detection result corresponding to each of the N images by:

performing at least one of following steps to obtain defect-related information of the yarn spindle, and determining the target detection result characterizing the defect degree of the yarn spindle based on the defect-related information of the yarn spindle:

counting a quantity of defects in each of N first detection results to obtain a total quantity of defects of the yarn spindle;

obtaining defect positions in the yarn spindle based on defect positions in each of the N first detection results; or obtaining a target defect type of the yarn spindle based on defect types in each of the N first detection results.

11. The non-transitory computer-readable storage medium of claim 10, wherein the instruction, when executed, causes the computing device to, based on determining that the target detection result meets the preset defect value, obtain the target level of the yarn spindle based on the target detection result of the yarn spindle and the preset level of the yarn spindle by:

downgrading the preset level of the yarn spindle to obtain the target level of the detected yarn spindle based on determining that at least one of the following is satisfied:

the total quantity of defects of the yarn spindle in the target detection result being greater than a preset threshold;

a defect position among the defect positions in the yarn spindle in the target detection result being within a preset defect position range; or the target defect type of the yarn spindle in the target detection result being within a preset defect type range.

12. The non-transitory computer-readable storage medium of claim 9, wherein the first network layer comprises at least a first sub-network layer, a second sub-network layer, a third sub-network layer and a fourth sub-network layer, wherein the first sub-network layer is used to extract local features from the input image to obtain a low-frequency feature map, the second sub-network layer is used to obtain a target weight factor of the feature map of the input image, the third sub-network layer is used to extract global features from the input image to obtain a global feature map, and the fourth sub-network layer is used to fuse the low-frequency feature map and the global feature map based on the target weight factor to filter out noise and obtain the low-level feature map.

* * * * *